Nov. 3, 1931.  W. S. GRIFFITH  1,830,272
MACHINE FOR MAKING CUP WASHERS
Filed March 28, 1930  8 Sheets-Sheet 2
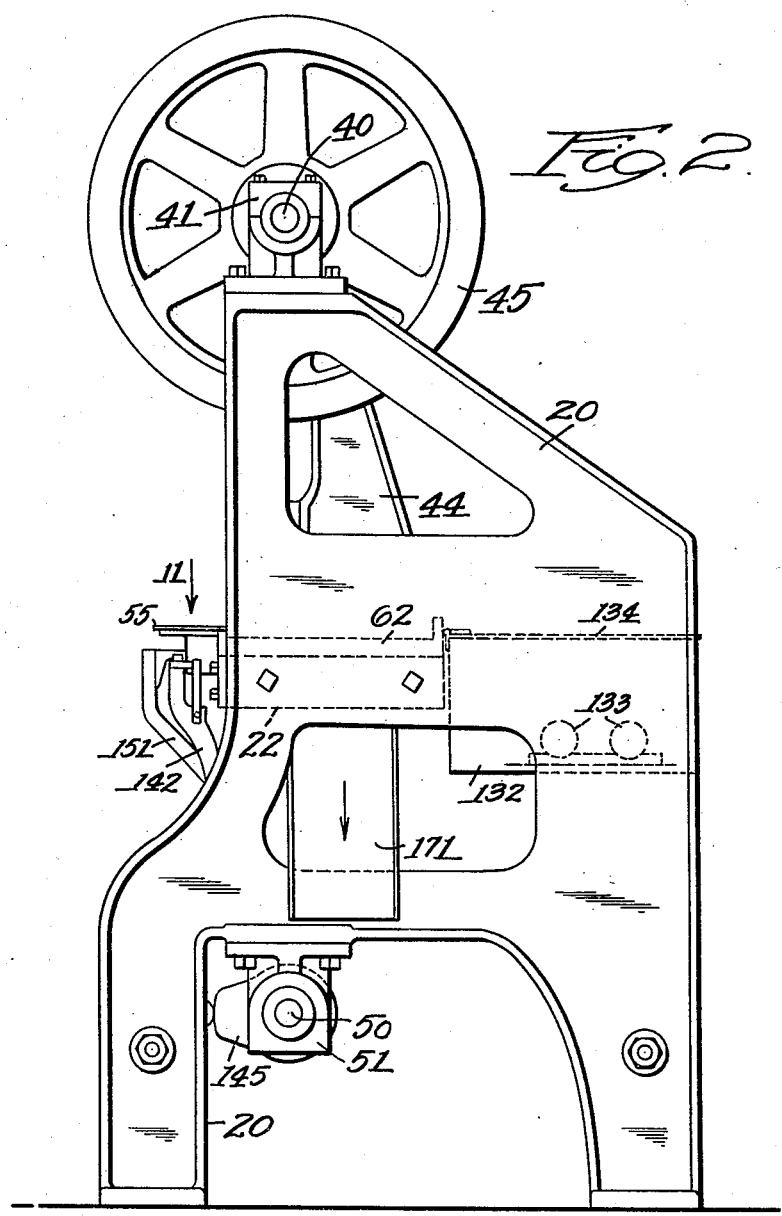

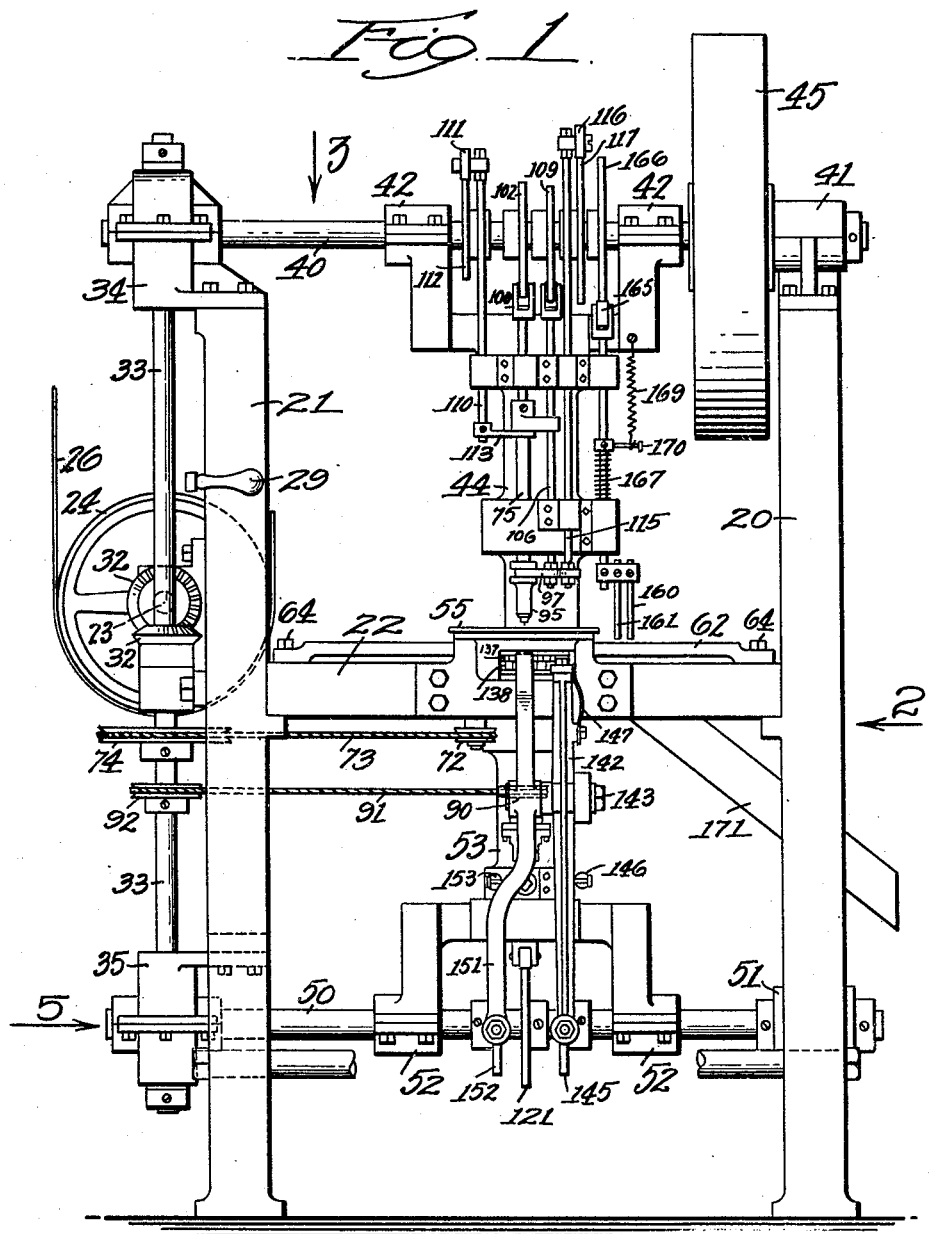

Nov. 3, 1931.  W. S. GRIFFITH  1,830,272
MACHINE FOR MAKING CUP WASHERS
Filed March 28, 1930    8 Sheets-Sheet 3
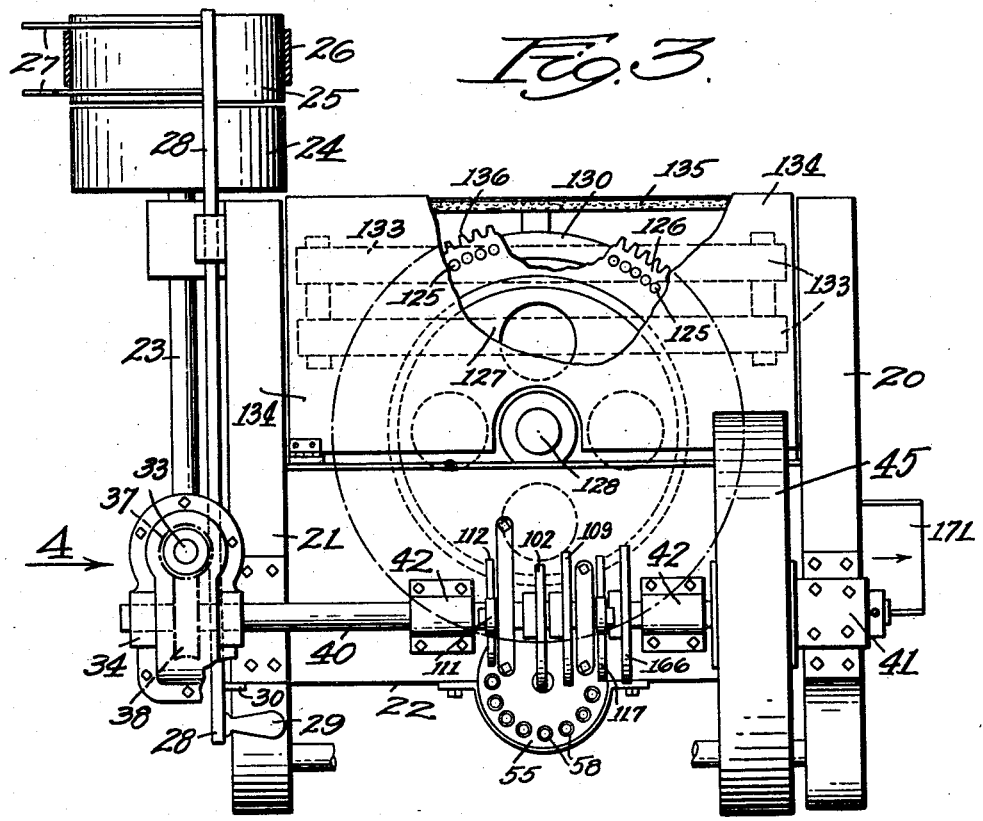
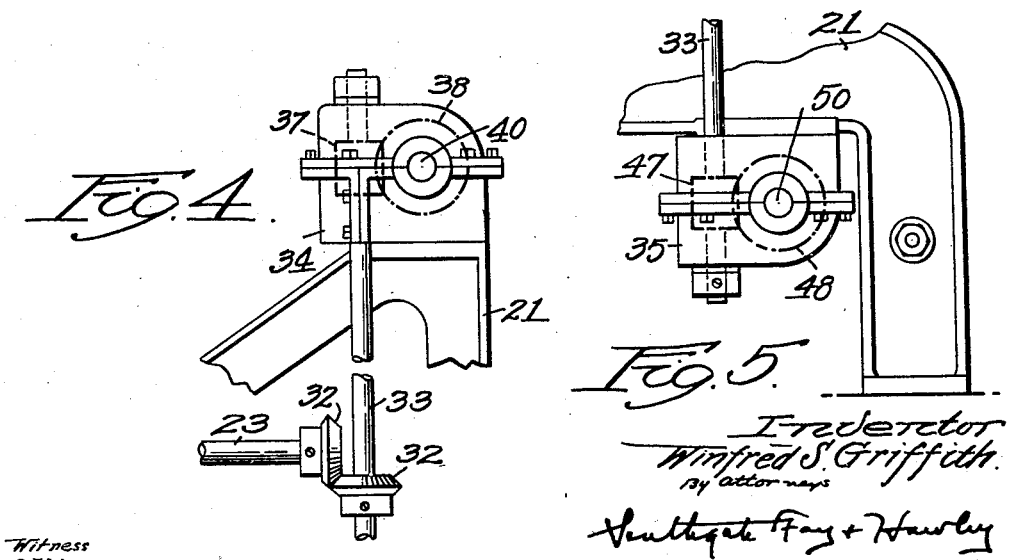

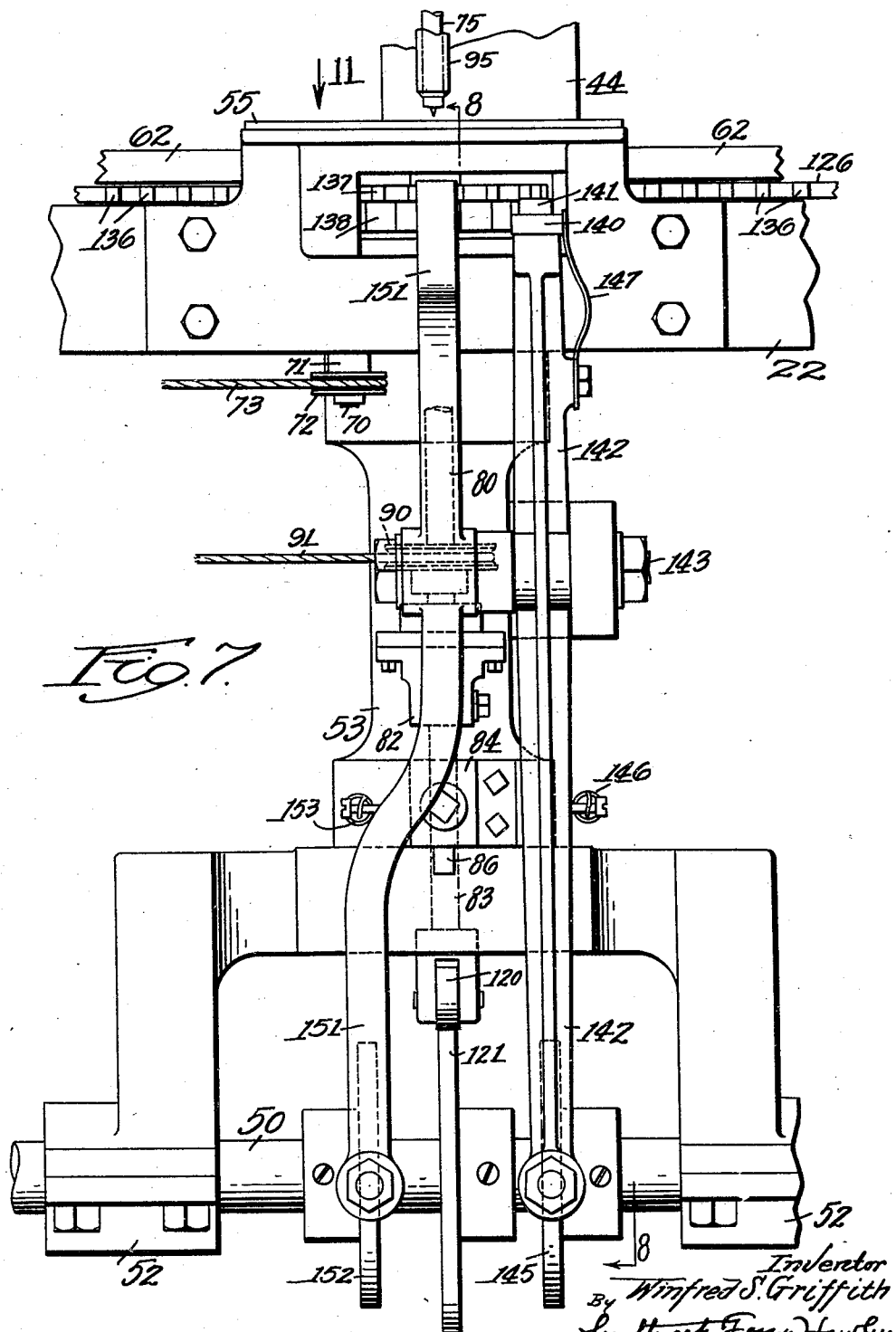

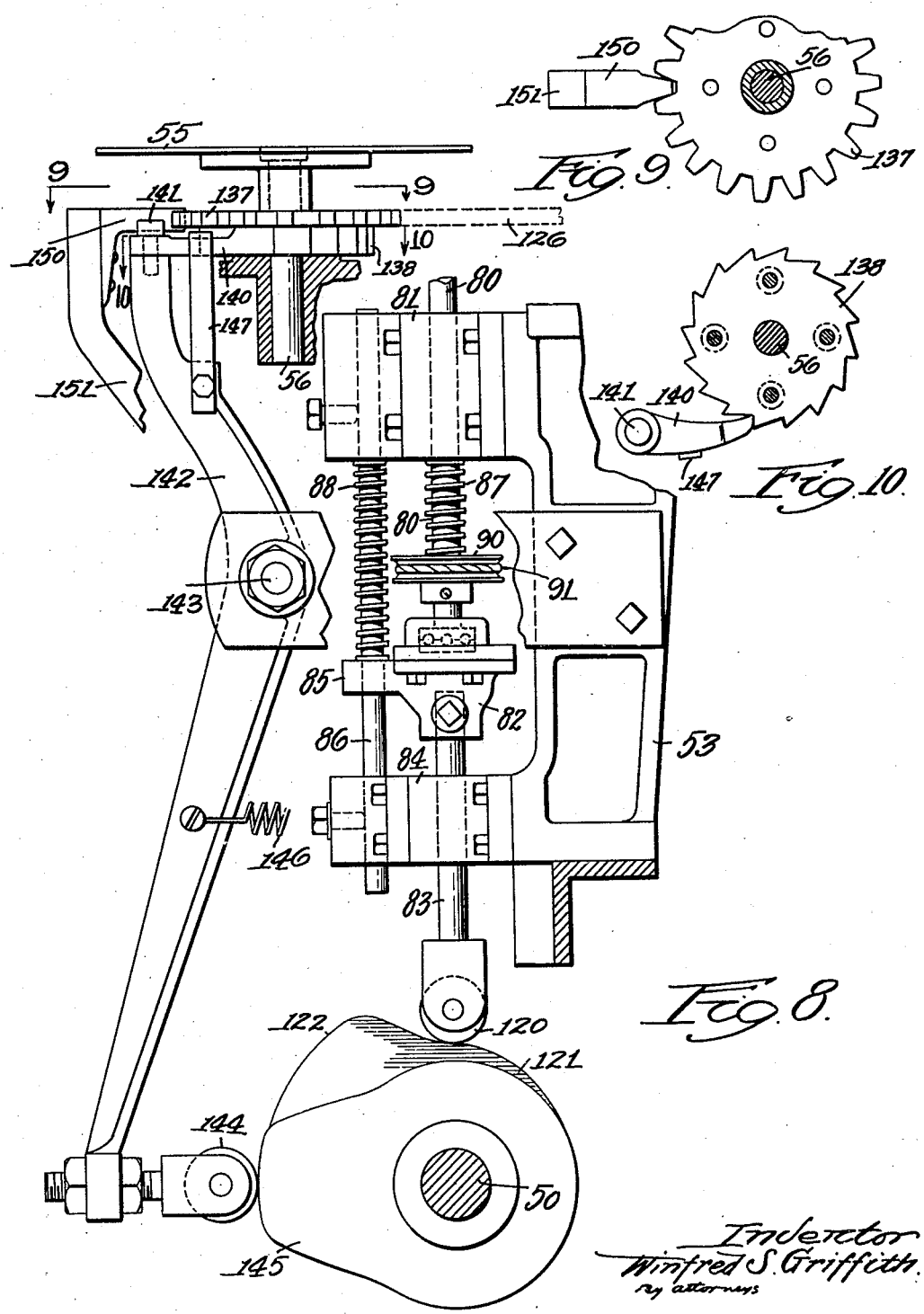

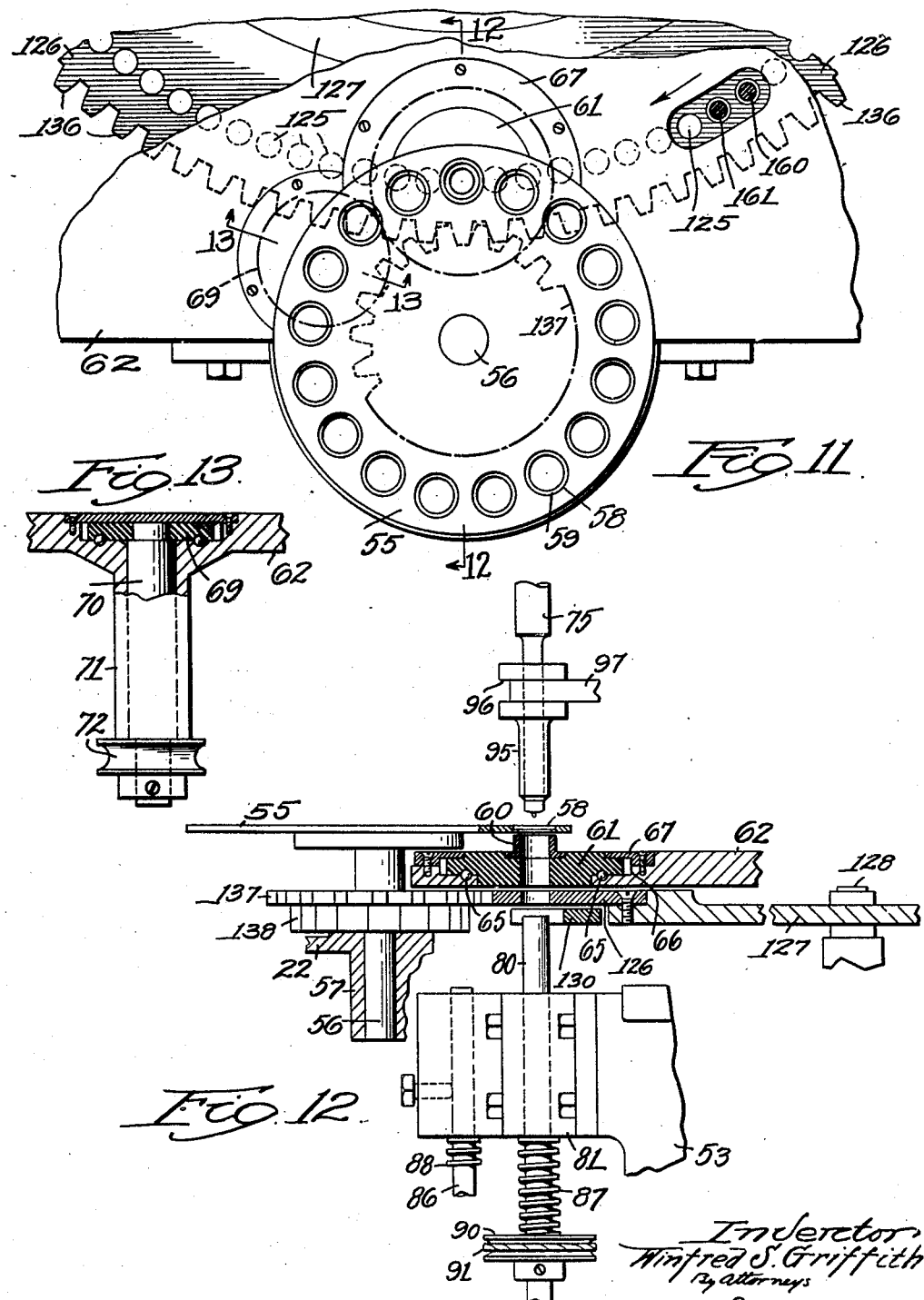

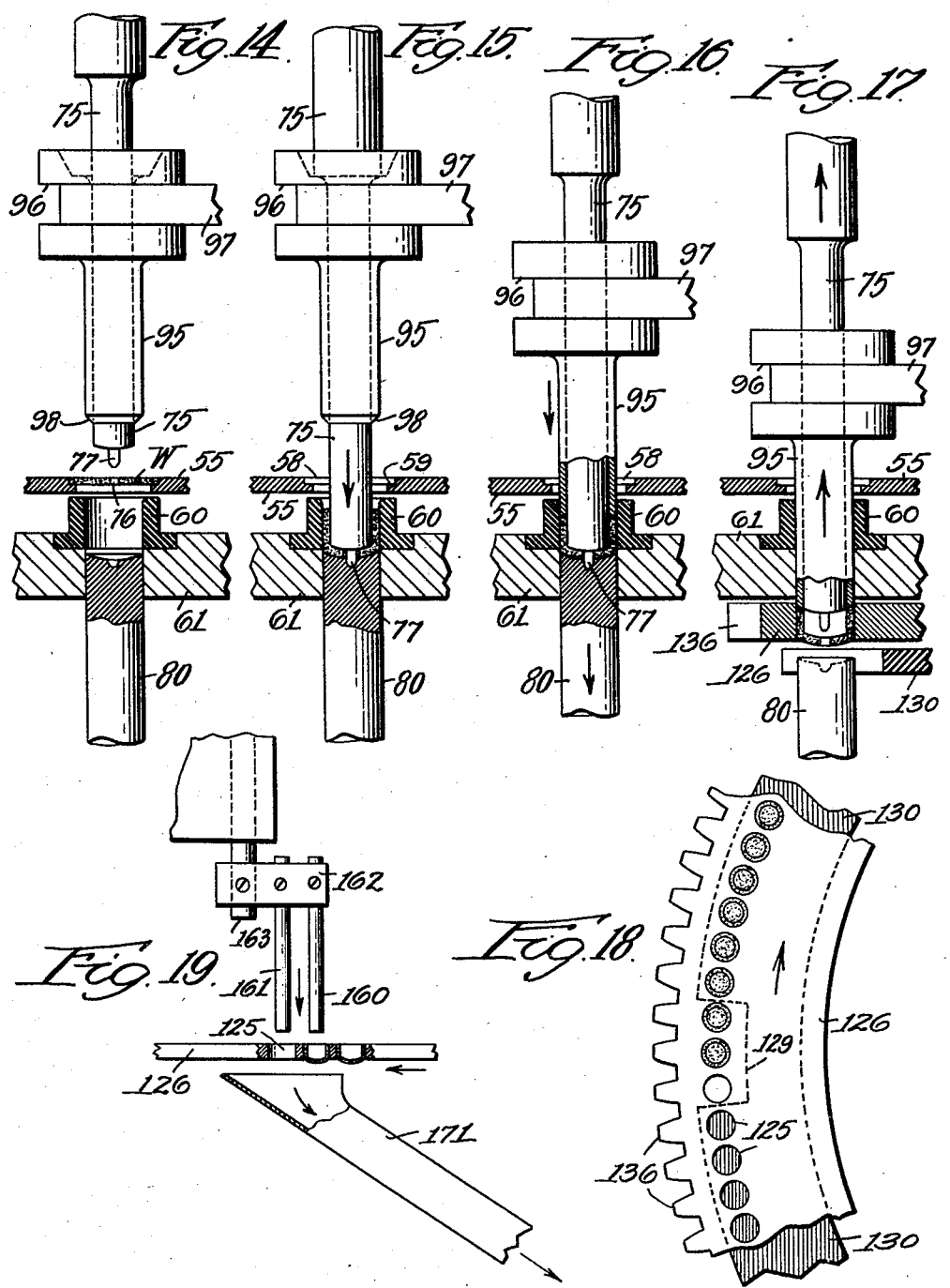

Patented Nov. 3, 1931

1,830,272

UNITED STATES PATENT OFFICE

WINFRED S. GRIFFITH, OF WORCESTER, MASSACHUSETTS, ASSIGNOR TO GRATON & KNIGHT COMPANY, OF WORCESTER, MASSACHUSETTS, A CORPORATION OF MASSACHUSETTS

MACHINE FOR MAKING CUP WASHERS

Application filed March 28, 1930. Serial No. 439,813.

This invention relates to a machine for making cup washers and other similar articles.

It is the general object of my invention to provide a machine in which cup washers may be manufactured by a continuous process.

A further object is to provide means by which the formed washers may be thoroughly dried and set in the desired form before removal from the machine. I also provide means by which one or both of the forming tools may be positively rotated during the forming operation.

My invention further relates to arrangements and combinations of parts which will be hereinafter described and more particularly pointed out in the appended claims.

A preferred form of the invention is shown in the drawings, in which

Fig. 1 is a front elevation of my improved machine;

Fig. 2 is a side elevation thereof, looking in the direction of the arrow 2 in Fig. 1;

Fig. 3 is a plan view, partially broken away and looking in the direction of the arrow 3 in Fig. 1;

Fig. 4 is a detail side elevation of certain driving connections, looking in the direction of the arrow 4 in Fig. 3;

Fig. 5 is a detail side elevation of additional driving connections, looking in the direction of the arrow 5 in Fig. 1;

Fig. 7 is an enlarged front elevation of additional actuating mechanism;

Fig. 8 is a sectional side elevation of certain parts, taken along the line 8—8 of Fig. 7;

Figure 6:
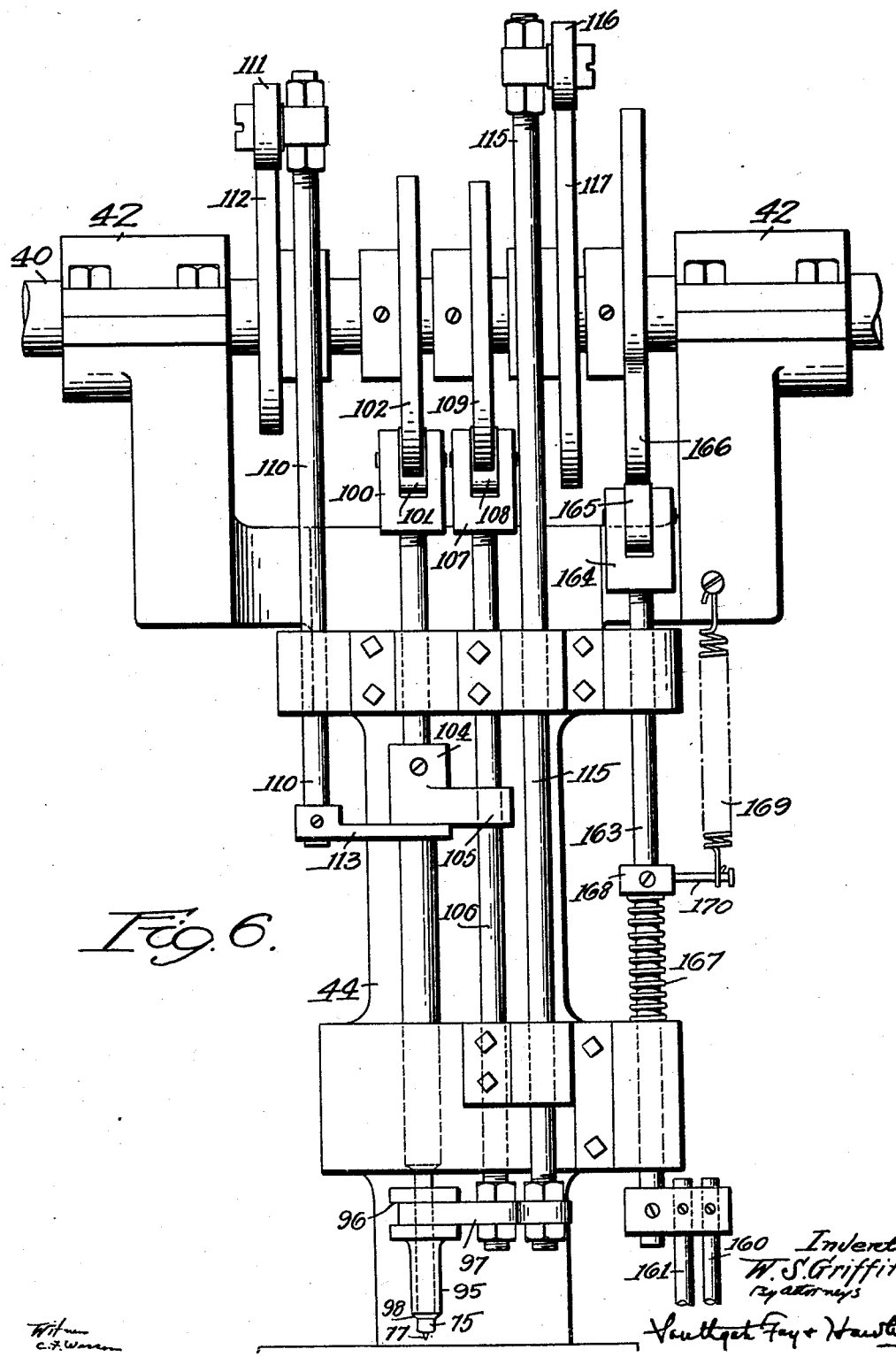
Fig. 6 is an enlarged front elevation of certain actuating mechanism.

Figs. 9 and 10 are detail sectional plan views, taken along the lines 9—9 and 10—10 in Fig. 8 respectively;

Fig. 11 is an enlarged plan view of certain parts, looking in the direction of the arrow 11 in Fig. 2;

Figs. 12 and 13 are detail sectional elevations, taken along the lines 12—12 and 13—13 in Fig. 11;

Figs. 14 to 17 are detail front elevations, partly in section and illustrating successive steps in the formation of a cup washer;

Fig. 18 is a plan view of a portion of the conveyer plate and the supporting structure underlying said plate; and Fig. 19 is a detail front elevation, partly in section, showing the ejector mechanism.

General construction

Referring to the drawings, my improved machine comprises side frame members 20 and 21 supporting a cross frame member 22. A main drive shaft 23 (Fig. 3) is mounted in bearings on the side frame 21 and is provided at its rear end with a tight pulley 24 and loose pulley 25. Power is supplied through a driving belt 26 which may be shifted from the loose to the tight pulley or vice-versa by shipper fingers 27 mounted on a shipper rod 28 extending forward to the front of the machine and provided with a handle 29 and stop pin 30.

At its front end, the shaft 23 is connected by bevel gears 32 (Fig. 1) to an upright shaft 33 rotatable in an upper bearing 34 and a lower bearing 35.

At its upper end, the shaft 33 is connected by a worm 37 (Fig. 4) and worm wheel 38 to an upper cam shaft 40, one end of which is mounted in a bearing 34 on the side frame 21 and the other end in a bearing 41 on the side frame 20.

The cam shaft 40 is also provided with spaced bearings 42 formed at the end of a frame member 44, the lower end of which is secured to the cross frame 22 previously described. The cam shaft 40 is provided with a plurality of cams to be described and also with a fly wheel 45 (Fig. 1) by which smoothness of operation and uniformity of speed is promoted.

At its lower end the shaft 33 is connected by a worm 47 (Fig. 5) and worm wheel 48 to a lower cam shaft 50, one end of which is rotatable in the lower bearing 35 of the shaft 33 and the other end in a bearing 51 in the side frame 20.

Spaced intermediate bearings 52 for the shaft 50 are formed in the lower end of a frame member 53, the upper end of which is secured to the cross frame 22. The lower shaft 50 is also provided with a plurality of cams to be described.

Through the mechanism above set forth, provision is made for rotating the upper cam shaft 40 and lower cam shaft 50 at relatively low speed while the upright shaft 33 is rotated at a substantially higher speed.

Forming mechanism

The forming mechanism of my improved machine is best shown in Figs. 11 and 12 and the operation thereof is disclosed in Figs. 14 to 17.

I provide a feed plate or carrier 55 mounted upon the upper end of a short shaft 56 rotatable in a bearing 57 in the cross frame 22.

The carrier 55 is provided with a series of holes 58, each of the right diameter to receive a blank for the cup washer to be formed. A shoulder 59 is formed in each hole 58 to prevent the blank from falling through the carrier.

The blanks are placed in the holes 58 by the operator during the continued operation of the machine and the carrier 55 is advanced step by step by mechanism to be described, presenting successive blanks under the forming mechanism.

This forming mechanism comprises a die or bushing 60, preferably mounted upon a plate 61 which is rotatably supported in a frame member 62 which is secured at its ends to the cross frames 22 by bolts 64 (Fig. 1).

The plate 61 is preferably supported upon balls 65 (Fig. 12) and rotates in a recess 66 in the frame member 62, being held therein by a cover plate or ring 67. The periphery of the plate 61 may be provided with gear teeth engaged by the teeth of a pinion 69 (Fig. 13) formed at the upper end of a short shaft 70, rotatable in a bearing 71 depending from the frame member 62 and provided with a grooved pulley 72 at its lower end.

The pulley 72 is connected by a belt 73 (Fig. 1) to a larger pulley 74 on the upright shaft 33 previously described. Through these connections the die or bushing 60 may be positively rotated during the formation of the cup washer. If, in the formation of certain washers, rotation of the die is unnecessary or objectionable, the belt 73 may be thrown off and the die will remain stationary.

After the washer W has been moved by the carrier plate 55 to a position above the die or bushing 60, as indicated in Fig. 14, the washer is then forced downward by an upper plunger 75. The washer W is preferably provided with a small central opening 76 adapted to receive a centering pin 77 in the lower end of the plunger 75.

As the plunger 75 is forced downward by mechanism to be described, the washer W is forced into the die 60 and against the concave upper end of a lower plunger 80. The lower plunger 80 is slidable in a fixed bearing 81 (Fig. 12) and has a swivel connection at its lower end to a supporting member 82 (Fig. 8) secured to the upper end of a rod 83 slidable in a fixed bearing 84. An offset portion 85 of the member 82 is provided with an opening through which extends a guide rod 86 fixed in the bearings 81 and 84 previously described. A spring 87 on the plunger 80 and a spring 88 on the guide rod 86 act jointly to force the plunger 80 and supporting rod 83 yieldingly downward.

The plunger 80 preferably rests upon an anti-friction thrust bearing in the member 82 and is provided with a pulley 90 connected by a belt 91 to a driving pulley 92 on the upright shaft 33, through which connections the plunger 80 may be continuously rotated. If such rotation is not desired, the belt 91 may be thrown off.

A sleeve 95 (Fig. 14) is slidably mounted on the plunger 75 and is enlarged at its upper end to provide a groove 96 to receive a yoke member 97 by which the sleeve may be moved vertically. The lower end of the sleeve 95 is preferably beveled as indicated at 98 and is designed to be forced downward against the upper edge of the washer, as shown in Fig. 16, thus forming the upper edge to a desired contour. The sleeve also acts as a retaining device for the washer when the upper plunger 75 is withdrawn, as indicated in Fig. 17.

Cam actuating mechanism

The cam mechanism for actuating the plunger 75 and sleeve 95 is clearly shown in Fig. 6. The plunger 75 at its upper end is provided with a yoke member 100 supporting a cam roll 101 engaged by a cam 102 on the upper cam shaft 40. By such engagement, the plunger is moved downward to force the washer blank into the die 60.

A collar 104 is secured on the plunger 75 and is provided with an apertured arm 105 through which a rod 106 extends freely. The arm 105 acts to prevent angular movement of the plunger 75.

The rod 106 is provided at its upper end with a yoke member 107 supporting a cam roll 108 engaged by a cam 109 on the cam shaft 40. The yoke member 97 for the sleeve 95, previously described, is secured to the lower end of the rod 106, and the cam 109 is thus effective to move the sleeve 95 downward to engage the upper edge of the partially formed washer.

A rod 110 (Fig. 6) is slidably mounted in a fixed bearing and is provided at its upper end with a cam roll 111 engaged by a cam 112 on the cam shaft 40. The rod 110 is provided at its lower end with an offset arm 113 extending under the collar 104 on the plunger 75. The cam 112 is thus effective to raise the plunger 75 at the desired point in the operation of the machine.

An additional rod 115 is vertically slidable in fixed bearings and is connected at its lower end to an extension of the yoke member 97 previously described. At its upper end the rod 115 is provided with a cam roll 116 engaged by a cam 117 on the shaft 40. The cam 117 thus acts to raise the sleeve 95 at a desired point in the operation of the machine.

The supporting rod 83 (Fig. 8) previously described is provided with a cam roll 120 at its lower end engaging a cam 121 on the lower cam shaft 50. By such engagement the lower plunger 80 is raised against the action of the springs 87 and 88. The cam 121 is provided with a concentric portion 122 of considerable extent by which the lower plunger is held in raised position during the formation of the washer.

Conveying and drying mechanism

After the washer is formed by the cooperation of the die 60, upper plunger 75, lower plunger 80 and sleeve 95, the washer is forced downward into one of a series of openings 125 (Fig. 18) in a conveyer plate or drying ring 126. The ring 126 (Fig. 12) is mounted on a spider or rotatable frame member 127 pivoted on a fixed stud 128 and rotatable in a horizontal plane.

A stationary plate 130 underlies the openings 125 and prevents the formed washers from dropping out of the carrier plate or drying ring 126 except at a single point in the travel of the ring, where the washers pass over a cut-out portion 129 (Fig. 18) of the stationary plate 130.

Each washer remains in the drying ring 126 for substantially a complete revolution and during about one-half of this revolution the washer is moving through a drying chamber 132 (Fig. 2). The chamber 132 is formed between the side members 20 and 21 at the back of the machine and is provided with an electric heating device 133 or is heated in any other convenient manner. The hinged cover 134 is provided for convenient inspection and cleaning. The chamber 132 is also preferably provided with an asbestos or heat-insulating lining 135 (Fig. 3).

Intermittent feeding mechanism

The drying ring 126 (Fig. 11) is provided with gear teeth 136 engaged by the teeth of a pinion 137 secured to the carrier plate 55 and rotatable therewith. A ratchet plate 138 (Fig. 10) is secured to the pinion 137 and is engaged by a feed pawl 140 pivoted at 141 (Fig. 8) on the upper end of a feed lever 142. The lever 142 is mounted on a fixed pivot at 143 and is provided with a cam roll 144 engaging a cam 145 on the lower cam shaft 50. The spring 146 holds the cam roll in engagement with the cam and a flat spring 147 holds the pawl 140 in engagement with the ratchet plate 138. Intermittent movement of the feed lever 142 thus causes an intermittent advance movement of the carrier plate 55 and drying ring 126.

A holding pawl 150 (Fig. 9) is mounted at the upper end of a holding lever 151 (Fig. 8) which is pivoted on a fixed horizontal bearing and is provided at its lower end with a cam roll (not shown) which engages a cam 152 (Fig. 7) on the lower cam shaft 50. A spring 153 holds the lever 151 in yielding engagement with the cam 152. The cams are so timed that the holding pawl 150 is withdrawn during the advance movement of the feed pawl 140 and is thereafter pushed forward between the teeth of the pinion 137.

Ejecting mechanism

For the purpose of ejecting the formed and dried washer from the drying ring 126, I provide a pair of ejecting plungers 160 and 161 (Fig. 19) inserted in a cross arm 162 secured to the lower end of an actuating rod 163.

The rod 163 (Fig. 6) is vertically slidable in fixed bearings and has a yoke member 164 at its upper end provided with a cam roll 165 engaged by a cam 166 on the upper cam shaft 40. A spring 167 engages a collar 168 on the rod 163 and is supplemented by a spring 169 secured to a stud 170 projecting from the collar 168. The springs 167 and 169 act jointly to raise the rod 163 and hold the cam roll 165 against the cam 166.

Duplicate ejector plungers (160 and 161) are provided so that if the first plunger 160 fails to completely eject the formed washer, the second plunger 161 will complete the operation. As the washers are ejected, they fall into a chute 171 by which they are delivered to a suitable storage receptacle.

Operation

Having described the details of construction of my improved machine, I will now briefly summarize the operation:

The leather or other material is first blanked out in the form of flat discs of suitable diameter for the particular cup washer to be formed, the size of the blank varying according to the diameter of the finished washer and also in accordance with the depth thereof. The blanks are preferably provided with a small central opening by which the washers may be guided and centered during the forming operation.

The operator places the blanks in the openings 58 of the carrier plate 55, this hand feeding operation being performed during the continued operation of the machine. The carrier plate is intermittently advanced by the feed lever 142 and successively presents the blanks over the die 60, as indicated in Fig. 14, at which time the lower plunger 80 is in raised position.

The upper plunger 75 then descends, as indicated in Fig. 15, forming the washer against the lower plunger 80 and within the die 60. During this operation the die 60 and lower plunger 80, or either of them, may be continuously rotated, with the die 60 preferably rotating at a higher speed.

The sleeve 95 is then forced downward, as indicated in Fig. 16, compressing the upper edge of the washer and forming the same to a desired contour. The upper plunger 75, lower plunger 80 and sleeve 95 are then moved downward to transfer the formed washer to one of the openings 125 in the drying ring 126, after which the lower plunger 80 moves downward and the upper plunger 75 moves upward while the sleeve 95 remains momentarily in lower position, thus acting as a stripper for the plunger 75. The sleeve 95 then moves upward, thus restoring the parts to the position shown in Fig. 14.

The formed washer then remains in the drying ring 126 for substantially an entire revolution of the ring, during which revolution it is carried through the drying chamber 132 and is set in the desired form. As the completed washer is returned toward the front of the machine, it passes under the ejectors 160 and 161 and is removed from the drying plate, falling into the chute 171 through which it passes to the storage receptacle.

My improved machine is thus continuous in operation and produces a large output, while at the same time each washer is retained in the machine for a sufficient length of time so that it may be thoroughly dried and set in its finished form.

Having thus described my invention and the advantages thereof, I do not wish to be limited to the details herein disclosed, otherwise than as set forth in the claims, but what I claim is:—

1. A machine for forming cup washers comprising a die, an upper plunger, a lower plunger, an edge-forming sleeve, and positive, automatic means to move said parts in predetermined sequence to form and mold a cup washer under pressure.

2. A machine for forming cup washers comprising a die, an upper plunger, a lower plunger, an edge-forming sleeve, and means to move said parts in predetermined sequence to form a cup washer, and a feeding device effective to present successive washer blanks in operative position in said machine.

3. A machine for forming cup washers comprising a die, an upper plunger, a lower plunger, an edge-forming sleeve, means to move said parts in predetermined sequence to form a cup washer, and a feeding device effective to present successive washer blanks in operative position in said machine, said feeding device being provided with a plurality of openings to receive washer blanks.

4. A machine for forming cup washers comprising a die, an upper plunger, a lower plunger, an edge-forming sleeve, means to move said parts in predetermined sequence to form a cup washer, and a feeding device effective to present successive washer blanks in operative position in said machine, and means effective to give said feeding device an intermittent advancing movement.

5. A machine for forming cup washers comprising a die, an upper plunger, a lower plunger, an edge-forming sleeve, means to move said parts in predetermined sequence to form a cup washer, and a feeding device effective to present successive washer blanks in operative position in said machine, said feeding device being provided with a plurality of openings to receive washer blanks, and in which the successive washer blanks are pushed through said openings in said feeding device and into said die by said upper plunger.

6. A machine for forming cup washers comprising a die, an upper plunger, a lower plunger, an edge-forming sleeve, positive automatic means to move said parts in predetermined sequence to form and mold a cup washer under pressure, said latter means being effective to move said upper plunger downward to form the washer and to thereafter move said sleeve downward to shape the upper edge portion of said washer.

7. A machine for forming cup washers comprising a die, an upper plunger, a lower plunger, an edge-forming sleeve, positive, automatic means to move said parts in predetermined sequence to form and mold a cup washer under pressure, said latter means being effective to move said upper plunger downward to form the washer and to thereafter move said sleeve downward to shape the upper edge portion of said washer and also effective to give said sleeve and upper plunger an additional relative movement to strip the formed washer from said upper plunger.

8. A machine for forming cup washers comprising a die, forming means cooperating therewith, means to move said parts in predetermined sequence to form a cup washer, a drying carrier into which said washers are successively inserted by said forming means, and means to intermittently advance said drying carrier to receive successive washers.

9. A machine for forming cup washers comprising a die, forming means cooperating therewith, means to move said parts in predetermined sequence to form a cup washer, a drying carrier into which said washers are successively inserted by said forming means, means to intermittently advance said drying carrier to receive successive washers, and a stationary supporting plate underlying said carrier throughout the major portion of its path of movement.

10. A machine for forming cup washers comprising a die, forming means cooperating therewith, means to move said parts in predetermined sequence to form a cup washer, a drying carrier into which said washers are successively inserted by said forming means, means to intermittently advance said drying carrier to receive successive washers, a drying chamber for said machine, said drying carrier comprising an annular member having edge portions passing into and through said drying chamber for conveying the formed washers by the advancing movement of said drying carrier.

11. A machine for forming cup washers comprising a die, forming means cooperating therewith, means to move said parts in predetermined sequence to form a cup washer, a drying carrier into which said washers are successively inserted by said forming means, means to intermittently advance said drying carrier to receive successive washers, a drying chamber for said machine, said drying carrier comprising a rotatable annular member having edge portions passing into and through said drying chamber for conveying the formed washers by the advancing movement of said drying carrier, said drying carrier being rotated, and means for ejecting each formed washer as it substantially completes a revolution in said carrier.

12. A machine for forming cup washers comprising a drying carrier, means to form and insert successive cup washers in said drying carrier, means to intermittently advance said carrier to receive successive washers, said drying carrier being rotated, and means for ejecting each formed washer as it substantially completes a revolution in said carrier, said latter means comprising duplicate ejecting plungers operative successively on a formed washer in said carrier.

13. A machine for forming cup washers comprising a die, forming means cooperating therewith, means to feed blanks to said die and forming means, means to move said parts in predetermined sequence to form a cup washer, a carrier into which said washers are successively inserted by said forming means, and means to intermittently advance said carrier to receive successive washers.

14. A machine for forming cup washers comprising a die, forming means cooperating therewith, means to feed blanks to said die and forming means, means to move said parts in predetermined sequence to form a cup washer, a carrier into which said washers are successively inserted by said forming means, means to intermittently advance said carrier to receive successive washers, and means effective to hold each washer in formed shape in said carrying means until said washer is set.

15. A machine for forming cup washers comprising a die, forming means cooperating therewith, means to feed blanks to said die and forming means, and means to move said parts in predetermined sequence to form a cup washer, a drying carrier into which said washers are successively inserted by said forming means, means to intermittently advance said drying carrier to receive successive washers, and means to hold each washer in formed shape in said carrying means until said washer is set and for heating and drying said washer while thus held in said carrying means.

16. A machine for forming cup washers comprising a die, forming means cooperating therewith, means to feed blanks to said die and forming means, means to move said parts in predetermined sequence to form a cup washer, a drying carrier into which said washers are successively inserted by said forming means, means to intermittently advance said drying carrier to receive successive washers, and means to hold each washer in formed shape in said carrying means until said washer is set and dried, and means for ejecting said washer from said carrying means after a predetermined drying interval.

17. A machine for forming cup washers comprising a die, an upper plunger, a lower plunger, an edge-forming sleeve, and positive, automatic means to move said parts in predetermined sequence to form and mold a cup washer under pressure, and means to cause relative rotation of certain parts of said forming means during the washer forming operations thereof.

18. A machine for forming cup washers comprising a die, an upper plunger, a lower plunger, an edge-forming sleeve, and positive, automatic means to move said parts in predetermined sequence to form and mold a cup washer under pressure, and means to cause relative rotation between said plungers as said washer is being formed.

In testimony whereof I have hereunto affixed my signature.

WINFRED S. GRIFFITH.